Dec. 5, 1961  F. W. COWDREY  3,011,807
FLARELESS TUBE COUPLING WITH MEANS ALLOWING VISUAL INSPECTION
Filed Dec. 2, 1955

INVENTOR,
FRANK W. COWDREY
BY Lyon & Lyon
ATTORNEYS

United States Patent Office 3,011,807
Patented Dec. 5, 1961

3,011,807
FLARELESS TUBE COUPLING WITH MEANS ALLOWING VISUAL INSPECTION
Frank Warren Cowdrey, Pacific Palisades, Calif., assignor to Parker Hannifin Corporation, a corporation of Ohio
Filed Dec. 2, 1955, Ser. No. 550,560
2 Claims. (Cl. 285—342)

This invention relates to tube couplings of the general type shown in the Kreidel Patent No. 2,139,413. Couplings of this type are known in the art as flareless tube fittings since the end of the tube is not flared for reception between coupling seats, as is the case with conventional tube couplings.

A disadvantage of the type of coupling shown in the Kreidel patent is that it is not possible by visual inspection alone to determine whether a fully effective seal has been attained. Consequently, each connection assembly must be hydraulically tested if it is necessary to prevent any defective sealing assemblies from going into use. This problem arises in connection with tube couplings for aircraft parts and particularly for tube couplings used with stainless steel tubing.

Accordingly, it is an important object of my invention to provide a tube coupling of the flareless type which produces a "visible bite" in order that defective seals can be located by visual inspection alone, thereby making unnecessary the hydraulic testing of each individual assembly.

It is another object of the present invention to produce such a tube coupling particularly adapted for use on stainless steel tubes.

A more particular object is to provide an improved form of tube coupling which employs a ferrule or sleeve having a tapering counterbore and having a cutting edge located in a shallow recess at the small forward end of the counterbore, the cutting edge being formed by the intersection of a concave surface and the counterbore.

Another object is to provide a device of this type in which the concave surface and counterbore meet at an angle which is slightly more than a right angle, the concave surface providing a gradually increasing angle for producing the ridge on the tubing in advance of the cutting edge.

Other and more detailed objects and advantages will appear hereinafter.

Figure 1:
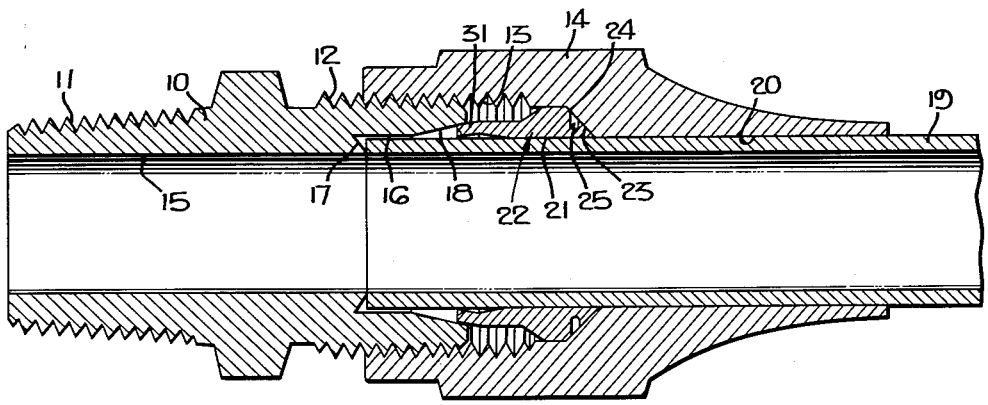
FIGURE 1 is a longitudinal sectional view showing the parts of the tube coupling preparatory to tightening of the nut.

Referring to the drawings:

The tubular body 10 is provided with threads 11 for connection to another member, not shown. The body 10 is also provided with threads 12 for engagement with the threads 13 of the nut 14. The body 10 has a central bore 15 and a counterbore 16 connected by shoulder 17. A converging mouth 18 on the body 10 extends from one end thereof to the counterbore 16.

A tube 19 which may be formed of stainless steel is adapted to be received within the counterbore 16 of the body 10. The tube extends axially through the central bore 20 in the nut and through the central cylindrical bore 21 in the ferrule or sleeve 22. A clamping face 23 on the nut is adapted to engage a rear surface 24 on the sleeve 22 for moving the sleeve axially along the tube 19. If desired, the surface 24 may be interrupted by an annular groove 25 of the type shown and described in the Wolfram Patent No. 2,496,510.

Figure 3:
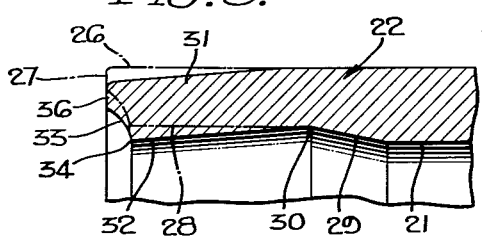
FIGURE 3 is a sectional detail illustrating the preferred manner of forming the projecting rim on the ferrule, or sleeve.
Figure 4:
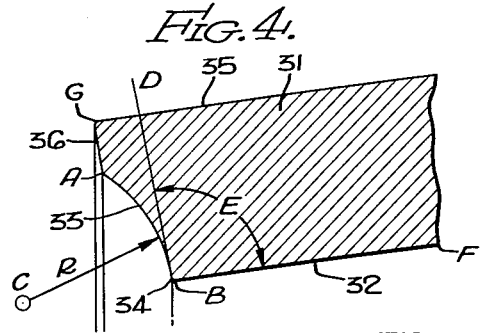
FIGURE 4 is an enlarged sectional view showing details of the cutting edge on the forward end of the sleeve.

As best shown in FIGURE 3, the forward portion of the sleeve 22 is preferably formed initially as indicated by the phantom lines 26. The shoulder 27 at the extreme forward end may be normal to the axis of the sleeve 22. A cylindrical counterbore 28 extends forwardly from the flaring surface 29 which leads to the cylindrical bore 21. The rim of the sleeve 22 is defined between the surfaces 26 and 28. By means of a suitable forming operation, for example, by burnishing, this rim at the forward end of the sleeve is bent inwardly about the intersection 30 of the counterbore 28 and the flaring surface 29. This produces an inward tapered annular rim 31 and changes the cylindrical counterbore 28 to a tapered converging bore 32. The sharp cutting edge 34 at the intersection of the tapered bore 32 and concave surface 33 is formed before the burnishing operation takes place. This greatly facilitates economical manufacture on a quantity basis. The burnishing operation deflects the rim 31 to the extent that the opening defined within the cutting edge 34 is substantially the same or slightly larger than the cylindrical bore 21.

The concave surface 33 is preferably curved. As shown, the curved line A—B formed by the intersection of an axial plane with the concave surface 33 constitutes a curve of radius R struck from point C. A tangent line D—B to this curved line A—B at the edge 34 defines an obtuse angle E with the bore line B—F. This obtuse angle E is preferably no greater than 100 degrees. This places the pressure edge G between the rim 31 and the conical mouth 18 at a location substantially forward of the cutting edge 34, thereby achieving adequate leverage to produce the desired constricting force on the cutting edge, without seriously interfering with the "visible bite" feature. Moreover, adequate strength is provided to support the cutting edge 34 against bending when forced into contact with a hard tube. The surface 33 places the cutting edge 34 at a location spaced rearwardly from the forward end of the sleeve rim 31 and to the rear of the pressure edge G and it provides more strength against the bending action occurring between the pressure edge G and the cutting edge 34. The recess formed by the surface 33 is shallow, that is, the intersection of the surfaces 33 and 32 defining the cutting edge 34 lies closer in a longitudinal direction to the extreme forward end G than the radial distance between the cutting edge 34 and the intersection between surfaces 33 and 36.

It will be noted that the wall thickness of the rim 31 is substantially uniform and is less than the wall thickness of the adjacent portion of the sleeve 22. The junction or pressure edge G between the outer edge of the surface 36 and the outer surface 35 of the rim 31 is not sharp but is very slightly rounded, as shown. The preforming of the sleeve 22 to conical shape is confined to the rim 31 of uniform wall thickness, and does not extend to the thicker portions of the sleeve. This has the advantage of assuring that the heavier sections of the sleeve will not be restricted in diameter so as to interfere with initial installation of the sleeve 22 upon the tube 19. Also, it has an advantage in combination with the fact that the inclination of the conical rim 31 is less than the inclination of the mouth 18 of the body 10, so that normal contraction of the sleeve during makeup is confined to the rim 31 of uniform wall thickness, and less makeup torque is required than if the heavier sections were required to be deformed.

Figure 2:
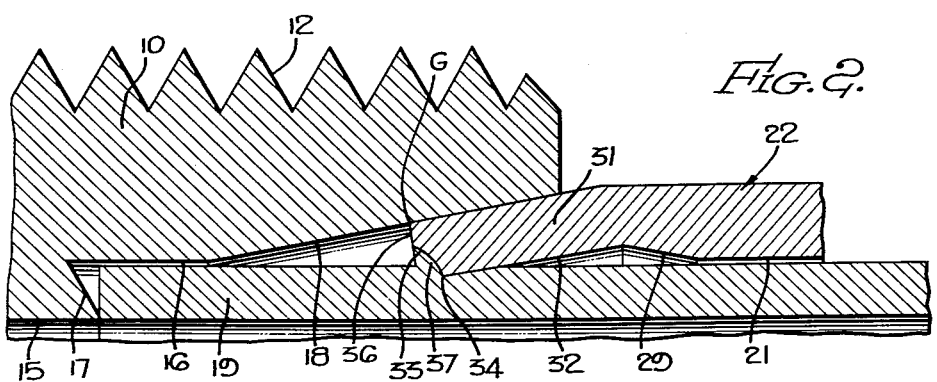
FIGURE 2 is a sectional view on an enlarged scale showing the parts in final sealing position.

When the sleeve 22 is assembled with the other parts, as shown in FIGURE 1, the nut 14 is turned relative to the body 10 thereby moving the sleeve 22 axially along the tube 19, bringing the slightly rounded corner G into engagement with the converging mouth 18. This action causes the cutting edge 34 to cut into the outer surface of the tube 19. The position of the parts at the time of first contact of the cutting edge 34 with the tube 19 is shown in FIGURE 1. Continued turning movement of the nut drives the sleeve 22 forward toward the converging mouth 18 and thereby causes constriction of the rim 31 and causes the cutting edge 34 to shear into the outer surface of the tube and build-up the annular ridge 37 in advance of the surface 33, as shown in FIGURE 2, thereby forming a grip and seal of excellent quality. Initially, the concave surface 33 has its largest diameter intersecting the surface 36 at the end of the rim 31. After contraction of the rim 31 for shearing into the tube 19 the largest diameter of said concave surface 33 still remains at the end of the rim 31. In other words, the concave surface 33 is always greatest in diameter at the end of the rim and there are no undercut portions of greater diameter behind the extreme end of the rim into which the ridge 37 might flow and be hidden from view.

The nut 14 may then be turned in the reverse direction to separate the nut from the body 10, and the sleeve 22 removed from the body 10 for visual inspection of the ridge 37. This ridge is readily visible for inspection since it is not concealed at the bottom of a counterbore as is the case with the device of the Kreidel patent referred to above. If the ridge 37 is continuous and of proper size, the inspector knows that the seal is of satisfactory quality.

Having fully described my invention, it is to be understood that I do not wish to be limited to the details herein set forth but my invention is of the full scope of the appended claims.

I claim:

1. A coupling for tubes comprising a tubular member to which a tube is to be attached and having a tapered converging mouth, an annular nut threadedly connected to said member, a sleeve having an axially extending rim provided with a bore, the forward end of the rim having an external bearing surface adapted to initially engage said tapered converging mouth, the forward end of the rim also having a concave surface forming a shallow recess and defining with the bore a circular cutting edge located rearwardly of said initial engagement between said bearing surface and said mouth, said concave surface in an axial plane forming with said bore an obtuse angle no greater than 100° at said cutting edge and a progressively larger angle therewith as said concave surface approaches said forward end of the rim, the sleeve being movable axially by the annular nut to bring the forward end of the rim into said initial engagement with said tapered converging mouth and thereby contract the rim and cause the cutting edge to shear the tube and form a ridge thereon in front of said concave surface, the depth of said recess being substantially less than the width thereof, said concave surface initially having its largest diameter at the end of said rim and said increase in angle being such that upon contraction of the rim for shearing into the tube the largest diameter of said concave surface remains at the end of said rim, whereby the entire ridge is visible upon disassembly of the nut and tubular member and without moving the sleeve relative to the tube.

2. For use with a tubular member having a tapered converging mouth, an annular nut threaded on said member and a tube extending through the nut into said converging mouth, the improvement comprising, in combination: a sleeve having an annular body and a rim extending axially from the body, the rim having a bore, the forward end of the rim having an external bearing surface adapted to initially engage said converging mouth, the forward end of the rim also being provided with a concave surface forming a shallow recess and defining with the bore a circular cutting edge located rearwardly of said initial engagement between said bearing surface and said mouth, said concave surface in an axial plane forming with said bore an obtuse angle not exceeding 100° at said cutting edge and curving uniformly to a progressively larger angle therewith as said concave surface approaches said forward end of the rim, the sleeve body being adapted to be contacted by the annular nut whereby the forward end of the rim may be moved axially into said initial engagement with said tapered converging mouth and thereby contract the rim and cause the cutting edge to shear the tube and form a ridge thereon in front of said concave surface, the depth of said recess being substantially less than the width thereof, said concave surface initially having its largest diameter at the end of said rim and said increase in angle being such that upon contraction of the rim for shearing into the tube the largest diameter of said concave surface remains at the end of said rim, whereby the entire ridge is visible upon disassembly of the nut and tubular member and without moving the sleeve relative to the tube.

References Cited in the file of this patent

UNITED STATES PATENTS

| 690,517 | Dart | Jan. 7, 1902 |
| 2,455,667 | Franck | Dec. 7, 1948 |
| 2,460,635 | Herold | Feb. 1, 1949 |
| 2,701,149 | Kreidel et al. | Feb. 1, 1955 |
| 2,738,994 | Kreidel et al. | Mar. 20, 1956 |

FOREIGN PATENTS

| 38,350 | Netherlands | June 15, 1936 |
| 110,622 | Great Britain | May 30, 1940 |
| 914,921 | Germany | July 12, 1954 |